(12) United States Patent
Moennig et al.

(10) Patent No.: US 10,344,484 B2
(45) Date of Patent: Jul. 9, 2019

(54) COMPOSITE THERMAL INSULATION SYSTEM

(75) Inventors: Sven Moennig, Trostberg (DE); Stefan Rossmayer, Marktredwitz (DE); Stephan Detrois, Fachingen (DE); Thomas Gastner, Wald an der Alz (DE)

(73) Assignee: BASF SE, Ludwigshafen Am Rhein (DE)

( * ) Notice: Subject to any disclaimer, the term of this patent is extended or adjusted under 35 U.S.C. 154(b) by 235 days.

(21) Appl. No.: 13/978,615

(22) PCT Filed: Jan. 12, 2012

(86) PCT No.: PCT/EP2012/050405
§ 371 (c)(1),
(2), (4) Date: Aug. 22, 2013

(87) PCT Pub. No.: WO2012/098040
PCT Pub. Date: Jul. 26, 2012

(65) Prior Publication Data
US 2014/0318069 A1    Oct. 30, 2014

(30) Foreign Application Priority Data
Jan. 17, 2011   (EP) .................................... 11151091

(51) Int. Cl.
*E04F 13/08*     (2006.01)
*E04B 1/76*      (2006.01)
*E04B 1/74*      (2006.01)

(52) U.S. Cl.
CPC .......... *E04F 13/0885* (2013.01); *E04B 1/762* (2013.01); *E04B 2001/742* (2013.01); *Y02A 30/243* (2018.01); *Y02B 80/14* (2013.01)

(58) Field of Classification Search
CPC ... E04B 1/74; E04B 1/742; E04B 1/76; E04B 1/762; E04B 1/7625; E04B 1/7629;
(Continued)

(56) References Cited

U.S. PATENT DOCUMENTS 5,866,027 A     2/1999   Frank et al.
6,068,882 A *   5/2000   Ryu .............................. 427/246
(Continued)

FOREIGN PATENT DOCUMENTS

DE          32 23 246 A1     1/1983
DE          32 29 318 A1     2/1984
(Continued)

OTHER PUBLICATIONS

PCT/EP2012/050405—International Search Report, dated Apr. 27, 2012.
(Continued)

*Primary Examiner* — Jessica L Laux
(74) *Attorney, Agent, or Firm* — Curatolo Sidoti Co., LPA; Salvatore A. Sidoti; Joseph G. Curatolo

(57) ABSTRACT

The invention relates to an insulated building wall comprising a composite thermal insulation system and an external building wall, where the composite thermal insulation system is affixed to the side of the building wall facing away from the building, the composite thermal insulation system comprising an at least two-layer thermal insulation cladding, with at least two layers each containing from 25 to 95% by weight of aerogel and from 5 to 75% by weight of inorganic fibers and from 0 to 70% by weight of inorganic fillers, wherein the layers of the thermal insulation cladding are joined to one another by means of an inorganic binder and the composite thermal insulation system has a gross calorific potential of less than 3 MJ per kilogram.

19 Claims, 1 Drawing Sheet

(58) Field of Classification Search
CPC ........ E04B 1/7662; E04B 1/7666; E04B 1/78;
E04B 1/80; E04B 2/02
USPC ............ 52/404.1, 404.4, 407.3, 407.4, 796.1
See application file for complete search history.

(56) References Cited

U.S. PATENT DOCUMENTS

| | | | |
|---|---|---|---|
| 6,415,573 B1 | 7/2002 | Moulder | |
| 7,078,359 B2* | 7/2006 | Stepanian et al. | 442/59 |
| 7,468,205 B2* | 12/2008 | Schwertfeger et al. | 428/323 |
| 8,820,016 B2* | 9/2014 | Zhou et al. | 52/407.4 |
| 2002/0025427 A1 | 2/2002 | Schwertfeger et al. | |
| 2002/0061396 A1* | 5/2002 | White | 428/293.4 |
| 2002/0094426 A1 | 7/2002 | Stepanian et al. | |
| 2003/0077438 A1 | 4/2003 | Frank et al. | |
| 2004/0077738 A1* | 4/2004 | Field et al. | 521/50 |
| 2007/0026214 A1* | 2/2007 | Bullock et al. | 428/294.7 |

FOREIGN PATENT DOCUMENTS

| | | |
|---|---|---|
| DE | 195 33 564 A1 | 3/1997 |
| DE | 197 02 240 A1 | 7/1998 |
| EP | 0 396 076 A1 | 11/1990 |
| EP | 1 408 168 A1 | 4/2004 |
| WO | WO 95/06617 A1 | 3/1995 |
| WO | WO 96/15997 A1 | 5/1996 |
| WO | WO 96/41924 A1 | 12/1996 |
| WO | WO 2006/074449 A2 | 7/2006 |
| WO | WO 2007/086819 A2 | 8/2007 |
| WO | W0 2008/110818 A1 | 9/2008 |
| WO | WO 2010/046074 A1 | 4/2010 |

OTHER PUBLICATIONS

PCT/EP2012/050405—International Written Opinion, dated Apr. 27, 2012.
PCT/EP2012/050405—International Preliminary Report on Patentability, dated Jul. 17, 2013.
Hüsing, et al., "Aerogels", Ullmann's Encyclopedia of Industrial Chemistry, Dec. 15, 2006, Published Online, abstract only.
Bonding and Coating Applications of PQ® Soluble Silicates, PQ Corporation, Bulletin 12-31, 2006.
PQ® Potassium Silicates Information Booklet, PQ Corporation, 2004.
Spaceloft® Insulation Information Data Sheet, Aspen Aerogels, Inc., 2010.
Super Calstik® Information Data Sheet (IIF-108 04-10), Industrial Insulation Group, 2005.
Preliminary Opinion of the European Patent Office Opposition Division for European Patent Application No. 12 700 805, dated Nov. 15, 2016.
Decision of the European Patent Office in Application No. 12700805.0, dated Jul. 6, 2017.
Aspen Aerogels, Safety Data Sheet, Spaceloft® A2, Mar. 24, 2011.

* cited by examiner

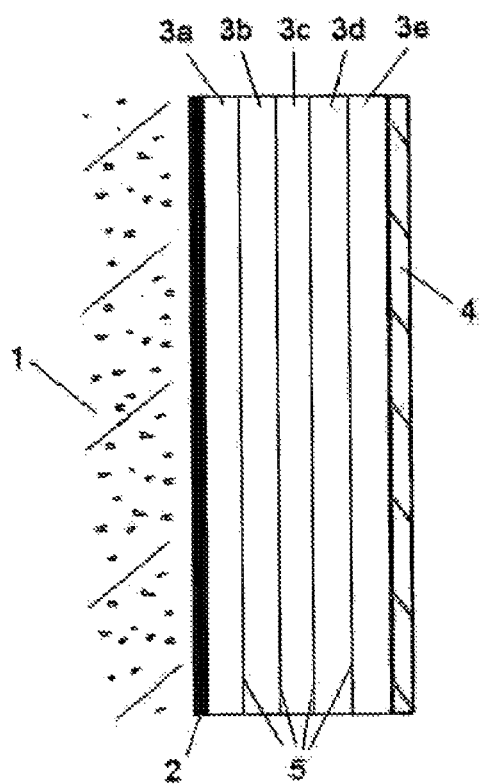

COMPOSITE THERMAL INSULATION SYSTEM

CROSS REFERENCE TO RELATED APPLICATIONS

This application is a national stage application of International Application No. PCT/EP2012/050405, filed 12 Jan. 2012, which claims priority from European Patent Application No. 11151091.3, filed 17 Jan. 2011, from which applications priority is claimed, and which are incorporated herein by reference.

The present invention relates to composite thermal insulation systems for thermally insulating an outer wall of a building, which comprises an at least two-layer thermal insulation cladding, with at least two layers each containing from 25 to 95% by weight of aerogel and from 5 to 75% by weight of inorganic fibres, wherein the layers of the thermal insulation cladding are joined to one another by means of an inorganic binder and the composite thermal system has a gross calorific potential of less than 3 MJ per kilogram.

In times of high energy costs, the thermal insulation both of new buildings and in the renovation of old buildings is accorded ever greater importance. For this purpose, composite thermal insulation systems are preferably applied to outer walls or exterior ceilings of heated buildings in order to reduce heat losses by transmission from the interior of the building. Such composite thermal insulation systems comprise an insulation layer, preferably in the form of boards, which are usually adhesively bonded to the building. Layers of render are applied to the insulation layer in order to protect the insulation layer against weathering influences. It is usual to apply a base render which is reinforced with a woven fabric layer and is covered by a layer of covering render. Both render layers together are applied in thicknesses of from about 2 to about 7 mm, preferably less than 3 mm, when synthetic resin renders are used, while mineral render systems can reach thicknesses in the range from about 8 mm to about 20 mm.

The strengths of insulation board and/or the load-bearing capacity of the surface of the building are generally not sufficient to ensure reliable long-term stability of a composite thermal insulation system having insulation elements which are merely adhesively bonded. For this reason, such insulation elements generally have to be secured, i.e. joined to the exterior wall, by means of insulation fasteners. Here, partial adhesive bonding of the insulation elements to the supporting substrate, namely the exterior wall, serves only to aid mounting, with the stiffness of the insulation elements to withstand the shear stresses resulting from shrinkage of the render being increased at the same time.

The insulation fasteners are anchored into the supporting substrate. They have discs having various diameters in the range from about 50 to 140 mm, which are applied to the side of the thermal insulation cladding farthest from the building. Their load-bearing capacity results from a metallic mandrel which at the same time spreads the anchor so as to produce a frictional bond. The insulation fasteners are introduced either before application of the reinforced base render layer or immediately after rendering. The discs of the insulation fasteners are consequently either above or below the layer of render. A significant advantage of installation of the insulation fasteners after rendering is that the reinforcing fabric is therefore also held by the insulation fasteners, as a result of which a more favorable low distribution and thus a possible reduction in the number of insulation fasteners required per unit area is achieved.

The number of insulation fasteners is determined as a function of the building height, the intrinsic load which is not insignificantly determined by the render thickness, the strength of the insulation material and the diameter of the insulation fasteners. It is usual to install from two to eight insulation fasteners per square meter, although up to fourteen insulation fasteners per square meter may be necessary in edge zones. Such edge zones encompass the from 1 to 2 m wide region around the margin of the exterior wall to be insulated. A further increase in the number of insulation fasteners necessary can result from the use of cut-to-size insulation elements which is required for practical construction reasons. The costs for the composite thermal insulation system increase with the number of insulation fasteners required, both in respect of the materials required and in respect of the working time, since precise placement of the insulation fasteners is necessary.

A further disadvantageous effect of the insulation fasteners embedded in or arranged underneath the layer of render is that the insulation fasteners show up on the surface due to reduced coverage in the case of weathering or penetration of moisture through the render. When the insulation fasteners are arranged in an irregular pattern, this gives disadvantageous visual effects.

Many insulation materials have been used in the past for the insulation layer of a composite thermal insulation system. In particular, polymeric foams, e.g. foams based on polyurethanes or polystyrene, mineral wool, glass fibres and also natural materials such as hemp, cork or perlites are used as insulation materials. However, conventional exterior wall insulation systems meet the desired requirements for the thermal insulation values only when appropriately thick layers of the respective materiel are used. Such massive buildups on the exterior walls, however, often spoil the overall aesthetic impression of the building and are therefore undesirable. Furthermore, such massive buildups mean that windows and doors have to be displaced and less light can shine into the interior rooms, which leads to a significant impairment of the quality of living.

It is known that hydrogels, e.g. silica hydrogels, which can be produced by precipitation of gel from water glass, can be dried under supercritical conditions to form microporous, three-dimensionally crosslinked silicon dioxide particles. Under the conditions of the supercritical drying, the surface tension of the fluid present in the microporous, three-dimensionally crosslinked particles is completely or largely eliminated. The objective here is to avoid shrinkage of the microporous three-dimensionally crosslinked particles to a significant extent during drying, since characteristic properties of the microporous, three-dimensionally crosslinked particles are entirely or partly lost on shrinkage. Such a product obtained by supercritical drying is, in the case of gels, referred to as an aerogel. Unlike conventional drying without special precautions, in which the gels experience a large volume contraction and form xerogels, only a small volume contraction (less than 15% by volume) thus takes place during drying in the vicinity of the critical point.

Aerogels, in particular those based on silicates, are already being used in composite thermal insulation systems because of their very good insulating properties and have the advantage that they lead to a significantly lower buildup of the wall at a given insulation performance. A typical value for the thermal conductivity of silicate aerogels in air at atmospheric pressure is in the range from 0.017 to 0.021 W/(m·K). The differences in the thermal conductivity of the silicate aerogels are essentially determined by the different size of the pores resulting from the production process, which is in the range from 10 to 100 nm.

The prior art for the production of aerogels by means of supercritical drying is comprehensively described in, for example, Reviews In Chemical Engineering, Volume 5, Nos. 1-4, pp. 157-198 (1988), in which the pioneering work of Kistler is also described.

WO-A-95 06 617 relates to hydrophobic silica aerogels which can be obtained by reacting a water glass solution with an acid at a pH of from 7.5 to 11, removing most of the ionic constituents from the hydrogel formed by washing with water or dilute aqueous solutions of inorganic bases white maintaining the pH of the hydrogel in the range from 7.5 to 11, displacing the aqueous phase present in the hydrogel by an alcohol and subsequently drying the resulting alcogel under supercritical conditions.

The production of insulation boards from pulverulent aerogels and organic or inorganic binders and optionally further aggregates is known. For example, WO 1996/60159937 describes a composite material which comprises from 10 to 95% by weight of aerogel particles and at least one inorganic binder. However, such boards have the disadvantage that relatively large amounts of binders have to be used to obtain a stable board. However, this leads to the thermal insulation properties being significantly worsened compared to the aerogels; thermal conductivities of 0.15 W/(m·K) are reported in the examples.

Owing to a high degree of hydrophobicization, commercially available silicate aerogel powders have a high organic content. The hydrophobicization is necessary to be able to dry aerogels subcritically after they have been produced, without formation of aerogels occurring, i.e. severe shrinkage and thus a loss of the good thermal insulation properties (see "Aerogels", N, Hüsing, U. Schubert, Ullmann's Encyclopedia of Industrial Chemistry, Sixth Edition, 2000 Electronic Release, Wiley-VCH, Weinheim 2000). The organic component intruded into the aerogels by the high level of hydrophobicization is problematical in terms of the burning behaviour. Commercially available silicate aerogel powders, for example Nanogel® from Cabot, are classified according to DIN 4102-1 into the burning class B1 (not readily flammable). However, for high-rise buildings up to a height of 100 meters, non-flammable systems (at least a burning class A2) are required.

Composite aerogel mats reinforced with fibres are at present being marketed commercially under the trade name Spaceloft® by Aspen Aerogel Inc. Thus, for example, US 2002/0094426 describes a composite aerogel mat and its use. However, such mats are available only in low thicknesses (about 1 cm) because of the production process and the necessity of supercritical drying. Production by supercritical drying has the advantage that the aerogel has to be hydrophobicized to a lesser extent, which is advantageous in terms of the burning behaviour. However, these mats have the disadvantage that they have to be applied in a number of layers in order to achieve a satisfactory insulation performance. Here, each layer has to be fastened individually to the wall by means of insulation fasteners, which is labour intensive and expensive and can also lead to heat bridges. Furthermore, the fibres used in the commercially available composite aerogel mats generally comprise organic polymers and are thus problematical in terms of the burning behaviour.

Furthermore, WO 2010/046074 discloses a composite thermal insulation system for insulating a wall of a building, which system comprises a first thermal insulation board containing from 20 to 90% by weight of aerogel and a second thermal insulation board which contains mineral wool. In an alternative embodiment, the system can also comprise at least one composite board which contains mineral wool and from 20 to 90% by weight of aerogels.

It was therefore an object of the present invention to provide a composite thermal insulation system for the thermal insulation of an exterior wall of a building, which system has a very low thermal conductivity and thus achieves very good insulation performance even at low layer thicknesses. The thermal insulation cladding should have such a structure that it is very easy to work by the user and can thus be matched on the building site to the circumstances of the building. At the same time, the thermal insulation cladding should have a high flexural strength and ideally be flat in order to achieve a very high long-term mechanical stability of the composite thermal insulation system.

BRIEF DESCRIPTION OF THE DRAWING

FIG. 1 is a side view of an illustrative embodiment of the composite thermal insulation system attached to a building wall.

This object has been achieved by an insulated building wall comprising a composite thermal insulation system and an external building wall, wherein me composite thermal insulation system is affixed to the side of the building wall facing away from the building, the composite thermal insulation system comprising an at least two-layer thermal insulation cladding, with at least two layers each containing from 25 to 95% by weight of aerogel and from 5 to 75% by weight of inorganic fibres and from 0 to 70% by weight of inorganic fillers, wherein the layers of the thermal insulation cladding are joined to one another by means of an inorganic binder and the composite thermal insulation system has a gross calorific potential of less than 3 MJ per kilogram.

The objective in respect of all requirements has been able to be achieved completely by the composite thermal insulation system of the invention. It has surprisingly been found that the composite thermal insulation system of the invention has a high long-term mechanical stability even when the thermal insulation cladding is adhesively bonded to the building, in particular by means of a mortar. In general, mechanical fastening points such as insulation fasteners can be dispensed with. Furthermore, it was surprising that the structure according to the invention makes it possible to obtain a composite thermal insulation system which is non-combustible. The composite thermal insulation system comes under burning class A2 in accordance with DIN 4102-1, having a gross calorific potential of less than 3 MJ per kilogram and thus being suitable, inter alia, as a composite thermal insulation system for high-rise buildings.

The gross calorific potential of the composite thermal insulation system is determined in accordance with DIN EN ISO 1716. This describes a method in which the specific heat of combustion of building materials is measured at constant volume in a bomb calorimeter. The gross calorific potential is also referred to as the PCS (pouvoir calorifique supérieur) value or calorific potential. The gross calorific potential is preferably less than 2.5 MJ per kilogram, particularly preferably less than 2 MJ per kilogram and in particular less than 1 MJ per kilogram. Furthermore, the gross heat of combustion of the inorganic binders is less than 4 MJ per square meter of the surface of the composite insulation system and preferably less than 3 MJ and most preferably less than 2 MJ. Any coating materials that may be used in the embodiments of the present application has preferably a gross heat of combustion of less than 4 MJ per square meter of the surface of the composite insulation system and particularly preferably less than 3 MJ and most preferably less than 2 MJ. Coatings and binders are used in such quantities to serve their primary coating or binding purpose and at the same time allow minimal fuel content that may contribute to gross heat of combustion.

To achieve low PCS values, preference is given to using aerogels which are formulated to have intrinsically low gross heat of combustion. In a preferred embodiment, the use of supercritical drying of an alcogel treated with a minimum of hydrophobic content is preferred to meet the requirements for burning class A2. Such a process is disclosed, for example, in WO 9506617. These processes make it possible to obtain aerogels having a low degree of hydrophobicization and thus a low gross heat of combustion.

In yet another preferred embodiment, the aerogels, which are preferably present in powder form, can subsequently be mixed with inorganic fibres and pressed to form boards, with an inorganic binder preferably being added. In particular, the inorganic fibres are mixed with the aerogels during production and before drying of the latter, enabling board-shaped components to be produced directly. In this regard, reference is made to U.S. Pat. No. 6,068,882.

The thermal insulation cladding preferably has at least two layers, preferably at least three layers, which each contain from 35 to 65% by weight of aerogel, from 15 to 65% by weight of inorganic fibres and from 0 to 50% by weight of inorganic fillers, in particular from 40 to 60% by weight of aerogel, from 25 to 50% by weight of inorganic fibres and from 0 to 35% by weight of inorganic fillers.

In a particular embodiment, the composite thermal insulation system of the invention comprises an at least three-layer thermal insulation cladding, with at least three layers each containing from 25 to 95% by weight of aerogel, from 5 to 75% by weight of inorganic fibres and from 0 to 80% by weight of inorganic filters and each layer having a thickness in the range from 0.5 to 2 cm.

As regards the aerogels, all aerogels based on metal oxides are particularly suitable for the present invention. The aerogel is preferably at least one aerogel based on silicon, aluminium and/or titanium, in particular a silicate aerogel.

In a preferred embodiment, the at least two-layer thermal insulation cladding is a board which is prefabricated and is joined to the other constituents on the building site to form a composite thermal insulation system. The thermal insulation cladding preferably has a thickness of from 250 mm to 10 mm, in particular from 100 mm to 20 mm and particularly preferably from 80 mm to 30 mm. The dimensions of the board can vary within wide ranges and the board preferably has a height of from 2000 to 800 mm and a width of from 1200 mm to 400 mm.

The inorganic binder by means of which the layers of the thermal insulation cladding are joined preferably has a layer thickness in the range from 0.05 to 1 cm, in particular from 0.1 to 0.6 cm and preferably from 0.15 to 0.4 cm. This can be mixed with fillers to form a mortar before application to the board and/or be provided with fillers by application and/or spraying after installation. In a further embodiment, the inorganic binder comprises polymers, in particular polar polymers and redispersible polymer powders, preferably homopolymers or copolymers composed of vinyl acetate, styrene, butadiene, ethylene, vinyl esters of Versatic acid and/or urea-formaldehyde condensation products, silicone and silicate resins and/or melamine-formaldehyde condensation products. Furthermore, the binder can contain thickeners, water retention agents, dispersants, rheology improvers, antifoams, retardants, accelerators, additives, pigments and organic or inorganic fibres.

Joining of the at least two layers of the thermal insulation cladding by means of an inorganic binder has the advantage that a very good mechanical bond between the layers is achieved. Furthermore, a high flexural strength of the thermal insulation padding is achieved. The at least two-layer thermal insulation cladding is preferably a board, so that this can be more easily transported to the site of use and processed there. Overall, significant use properties of the thermal insulation cladding are improved in this way. In a preferred embodiment, the inorganic binder by means of which the layers of the thermal insulation cladding are joined is at least one component selected from the group consisting of potassium water glass, sodium water glass, cement, in particular portland cement, and alkali-activated aluminosilicates, preferably potassium water glass.

A number of inorganic binders or adhesives may be employed to produce bonded panels and/or shapes. Such binders may be water based or based on other solvents. The water-based adhesives range from pure sodium silicate with various silica to sodium oxide ratios, to commercially available silicate based mixtures containing various inorganic fillers. Shown in table 1 are the adhesives used in aerogel panelization and their respective product composition.

TABLE 1

Inorganic adhesives utilized in bonding aerogel materials.

| Product | Manufacturer | Composition |
| --- | --- | --- |
| Sodium Silicate N | PQ Corporation | $SiO_2:Na_2O = 3.22$ |
| Sodium Silicate D | | $SiO_2:Na_2O = 2.00$ |
| Stixso RR | | $SiO_2:Na_2O = 3.25$ |
| Supercalstik | Industrial Insulation Group | Sodium Silicate/ Calcium Carbonate |
| Fosters 81-27 | Specialty Construction Brands | Sodium Silicate w/Kaolin Clay |
| Rutland Black | Rutland Company | Sodium Silicate w/Mica Filler |
| Childers CP-97 | Specialty Construction Brands | Sodium Silicate w/Talc Filler |
| Kasil | PQ Corporation | Potassium Silicate |

The adhesives listed above can be applied to the surface of a composite aerogel using standard HVLP spray or direct application methods. It is typically advantageous to include a very small percentage (>0.02 wt %) of a wetting agent within the inorganic binder. These wetting agents typically serve to reduce the interfacial surface tension of aqueous-based adhesive, enabling slight wet-out of the inherently hydrophobic aerogel surface and thus providing for substantially improved bond strengths. Failure to use a wetting agent typically results in weakened bond strengths at equivalent loadings due mainly to poor spreading of the substantially aqueous adhesive on lower surface energy substrates such as hydrophobic aerogel. Any type of anionic, cationic or non-ionic surfactants can be used. A list of common wettings that can be used are shown in 2.

TABLE 2

Surfactant/Wetting agents used to improve the compatibility of aqueous inorganic adhesives with an aerogel substrate.

| Surfactant/Wetting Agent | Type | Chemical Composition |
|---|---|---|
| Brij | Non-ionic | Polyoxyethylene glycol alkyl ether |
| Triton X-100 | Non-ionic | Polyoxyethyleneglycol octylphenol ether |
| Dow Corning Q2-5211 | Non-ionic | Silicone polyether |
| CTAB | Cationic | Cetyl trimethylammonium bromide |
| SDS | Anionic | Sodium Dodecyl sulfate |

In order to produce aerogel panels and/or shapes, inorganic adhesives with the aforementioned surfactant/wetting agent are applied at a level between 10 and 600 grams (dry coat weight) per square meter, preferably between 50 and 400 grams per square meter, more preferably between 100 and 300 grams per square meter. Any and all of the inorganic adhesives can be diluted with water to provide for improved wet-out and to enable and ease application via spray methods.

Sodium or potassium silicate based adhesives can affect bonding by two distinct methods: (1) chemical polymerization or (2) evaporation of water/dehydration. Evaporation of residual water content in the aqueous-based adhesive can be conducted using common heating methods such as convection, radiative or dielectric heating. It is preferable to initially treat wet panels and/or shapes at a temperature of not more than 95° C. Initial exposure of wetted panels/shapes above 95° C. resulted in diminished bond strengths due to the blistering and foaming of the silicate bond formed via the rapid/flash evaporation of water. After removing a minimum of 80% of the water from the inorganic adhesive at temperatures below 95° C., it is possible and preferable to subsequently heat treat the bonded panel at temperatures between 95 and 370° C., more preferably between 150 and 200° C. Accelerated cure times can be achieved with all inorganic aqueous based adhesives using microwave curing techniques. Bonded panels and/or shapes using all of the adhesives listed in 1 have been produced with a cure time as low as 2 minutes using an off-the-shelf domestic (1.2 kW) microwave and a PVC or cardboard mandrel.

Flat panel or board-type insulation for horizontal, vertical or slanted surfaces may be prepared by the methods and structures of the present invention. The creation of said structure, or system; comprising a composite of aerogel insulation, inorganic binder, coating material and an exterior covering material, can be performed in many ways as explained by the different embodiments of the present application.

After the overall size of the insulation system is determined, a fiber-reinforced aerogel material is cut to this particular length and width (assuming that it is rectangular in shape, although it could be any shape to match the geometry of the building section that is to be insulated). Next, a certain amount of inorganic or mostly inorganic binder is applied to one or both sides of each Insulation layer, not including the exterior facing layers (i.e., the side facing the building and the side facing away from the building). The covering weight for this inorganic adhesive can be between 1.0-750 g/m². This insulation system may comprise a minimum of two layers of aerogel blanket. The maximum layers are limited only by the handling considerations. Typically, 20 or more layers of aerogel blanket may be combined using the described approach.

Once the layers of aerogel have been coated with the inorganic adhesive, each layer is stacked upon one another and the edges are aligned such that all of the layers create one geometric shape with smooth edges (such as rectangle, in this case). It is possible to trim the edges of said insulation element in post-production, after the inorganic binder has cooled/cured and either before or after the coating material and/or exterior covering material is applied. Weights may optionally be applied over the surface of the adhered layers to ensure that the insulation system layers are bonded tightly together, but they are not necessary. The flat panel type insulation system is then cured either at room temperature (allowing the solvent, usually water, in the inorganic binder to evaporate) or is accelerated by placing in an oven at 30-115° C. The temperature and duration of curing may be varied depending on the number of aerogel layers, amount and solids content of the inorganic binder and the geometry and/or shape of the aerogel system.

Once the inorganic binder is completely cured, it creates a semi-rigid, high-flexural strength board-type insulation element that is multiple layers of aerogel thick. At this time, a covering/coating material may be applied. This coating is in a preferred embodiment polymeric in nature and applied via spray, dip, gravure roll, meyer roll, knife-over-roll, knife-over-web, curtain, roll or extrusion coated. Initially, this coating material was applied via roll coating.

The board-type insulation element can be fastened to a vertical, horizontal or slanted structure via mechanical or chemical bonding. Pin type fasteners are used to either puncture directly through the aerogel insulation system or fit into pre-drilled, pre-routed or pre-cut holes in the insulation system. The specific tip or type of pin fastener is selected based on the substrate that the aerogel system will be fastened to. Oftentimes, a hole will have to be drilled into the substrate in order for the pin to enter, expand and anchor itself via friction fit into the substrate structure. A disc is typically located on the opposite side of this pin type fastener. This disc is meant to distribute the load imparted by the fastener and physically hold the aerogel insulation system onto the substrate.

If needed, specific shapes can be cut out of a flat panel insulation system section. Cut-outs around windows, doors or vents; reliefs below eaves or drain-spouts or trimming of a panel to length at the end of a wall are all possible with this multi-layered solution. A static, hand-held utility knife is functional and probably the most common tool that would be used to cut the insulation panels.

To improve the insulation properties further, it is also possible, for the purposes of the invention, to add up to 50% by weight, preferably up to 10% by weight and in particular up to 5% by weight, based on the thermal insulation cladding, of pigments which scatter, absorb or reflect infrared radiation in the wavelength range from 3 to 10 μm. In particular, this can be carbon black. In this respect, reference is made to EP 0396076 A1, whose contents are hereby incorporated by reference into the application.

A preferred value of the thermal conductivity of the thermal insulation cladding of the invention in air at atmospheric pressure is <0.020 W/(m·K), in particular <0.018 W/(m·K) and particularly preferably <0.016 W/(m·K).

For the mechanical stability of the thermal insulation cladding, it is essential for the purposes of the invention for the cladding to contain fibres. In the case of inorganic fibres, these can be, in a preferred embodiment, glass fibres, rock fibres, metal fibres, boron fibres, ceramic fibres and/or basalt fibres, in particular glass fibres. It is also possible to mix a proportion of organic fibres into the thermal insulation cladding. Particularly suitable organic fibres are fibres based on polyethylene, polypropylene, polyacrylonitrile, polyamide, aramid or polyester. When adding the organic fibres, preference is given to the amount of organic fibres being selected so that the gross heat of combustion of the composite thermal insulation system is less than 3 MJ per kilogram. In a preferred embodiment, the composite thermal insulation system more particularly comprises <1% by weight of organic fibres and preferably no organic fibres, since, in particular, the simple workability, for example by means of a knife, is adversely affected by the flexibility of the organic fibres.

Furthermore, the thermal insulation cladding can contain inorganic fillers. These can be, for example, magnesium dioxide, titanium dioxide, titanium carbide, silicon carbide, iron(III) oxide, iron(II) oxide, zirconium silicate, zirconium oxide, tin oxide, manganese oxide a mixtures thereof, in particular magnesium dioxide or titanium dioxide.

In a preferred embodiment, the thermal insulation cladding is coated on the side facing the building and/or the side facing away from the building, preferably on the side facing the building and the side facing away from the building, with a polymeric material, in particular an acrylate coating, silicone containing coating, phenol-containing coating, vinyl acetate coating, ethylene-vinyl acetate coating, styrene acrylate coating, styrene-butadiene coating, polyvinyl alcohol coating, polyvinyl chloride coating, acrylamide coating or mixtures thereof, with the coatings also being able to contain crosslinkers. With regard to the coating, it should preferably be ensured that the amount of polymeric material used is selected so that the gross heat of combustion of the coating is less than 4 MJ per square meter of wall area.

In a particularly preferred embodiment, the thermal insulation cladding is coaled on the side facing the building and/or the side facing away from the building, preferably on the side facing the building and the side facing away from the building, with an inorganic binder. It is advantageous here for the coating to lead to a particularly torsion-resistant thermal insulation cladding and thus to a particularly high long-term mechanical stability of the composite thermal insulation system. In this context, it is particularly advantageous for the thermal insulation cladding to be joined on the side facing the building and/or the side facing away from the building in the outward direction in the following order by at least α) a woven mesh
and thereon at least
β) a woven fabric or nonwoven layer, where the thermal insulation cladding, the layer α) and the layer β) are joined by means of the inorganic binder. In a preferred embodiment, the thermal insulation cladding is coated on the side facing the building and on the side facing away from the building in such a way. Furthermore, it is considered to be advantageous for the binder to at least partially penetrate the layer β).

The inorganic binder for coating the thermal insulation cladding is in particular a hydraulic binder, preferably cement, in particular portland cement. Furthermore, geopolymers are also possible as binders. These are alkali-activated aluminosilicate binders, i.e. mineral materials which are formed by reaction of at least two components. The first component is one or more hydraulic, reactive solids containing $SiO_2$ and $Al_2O_3$, e.g. fly ash and/or metakaolin and/or cement. The second component is an alkaline activator, e.g. sodium water glass or sodium hydroxide. In the presence of water, contact of the two components results in curing by formation of an aluminosilicate-containing, amorphous to partially crystalline network, which is water-resistant. Furthermore, hydraulic lime can also be used as inorganic binder.

For coating of the thermal insulation cladding, the inorganic binder is preferably mixed with fillers to produce a mortar before application to the board and/or is provided with fillers by application and/or spraying after application to the board. In a further embodiment, the inorganic binder comprises polymers, in particular polar polymers and redispersed polymer powders, preferably homopolymers or copolymers composed of vinyl acetate, styrene, butadiene, ethylene, vinyl esters of Versatic acid and/or urea-formaldehyde condensation products and/or melamine-formaldehyde condensation products. Furthermore, the binder can contain thickeners, water retention agents, dispersants, rheology improvers, antifoams, retarders, accelerators, additives, pigments and organic or inorganic fibres.

In a preferred embodiment the woven mesh α) comprises monofilament wires or fibres, in particular glass fibres or metal mesh. Corrosion-resistant alloy steels, in particular stainless steel, can advantageously be used. However, it is also possible to use multifilament threads composed of natural fibres, synthetic fibres or glass fibres. The woven mesh α) preferably contains or consists of glass fibres. The woven mesh preferably has a wide mesh opening and can, in particular, have a spacing of the fibres in the range from 1 to 20 mm. The woven mesh is therefore capable of accommodating more inorganic binder in the voids formed by the mesh and as a result it gives the board excellent flexural stiffness, which is particularly advantageous in the mounting of relatively large thermal insulation boards.

The woven fabric or nonwoven layer β) preferably consists of a nonwoven, a textile fabric, a fine-meshed woven fabric or a fine-meshed knitted. The layer β) thus comprises or consists of individual synthetic fibres, synthetic yarn or glass fibres. The nonwoven layer β) is preferably a structural nonwoven made of polyester, polypropylene, polystyrene, glass fibres or mixtures thereof, in particular glass fibres. For the purposes of the invention, nonwovens are textile fabrics which comprise entangled individual fibres or threads. In contrast thereto, woven fabrics, drawn-loop knits and formed-loop knits made of regularly arranged threads or yarns. The nonwoven layer is configured so that it can be compressed under gentle pressure. In this way, binder can be taken up during the pressing operation and the nonwoven layer can be simultaneously impregnated with binder. Excess binder which would have to be removed by a wiping process is thus obtained to only a minimal extent, if at all. At the same time, the nonwoven layer is also provided with binder on the future surface of the thermal insulation cladding.

The layers α) and β) joined by the inorganic binder preferably have a combined thickness of from 0.5 to 5 mm.

In a preferred embodiment, the inorganic binder at least partly forms the outermost layer of the thermal insulation cladding. This gives the thermal insulation cladding a particularly good adhesion base and the cladding is thus a better support for the render and can also be joined more readily to the surface of the building, in particular by adhesive bonding. Owing to the particularly even surface, the thermal insulation cladding of the invention can be processed particularly well. To increase the adhesion properties and the stability of the thermal insulation cladding even further, it is also possible to apply a binder to the nonwoven layer on at least one side of the thermal insulation cladding after the lamination operation. Such a binder can again be a hydraulic binder, preferably cement a geopolymer, hydraulic lime and/or water glass. Furthermore, it is also possible, if appropriate, to use an accelerator.

A further aspect of the present invention is a process for producing a thermal insulation cladding according to the invention in the form of boards, in which the at least two layers of the thermal insulation cladding are firstly joined by means of the inorganic binder and the thermal insulation cladding is subsequently coated if appropriate. The thermal insulation cladding is preferably simultaneously coated from both sides.

In one embodiment, the thermal insulation cladding is coated with an inorganic binder, with the inorganic binder preferably being in each case introduced between the outsides of the thermal insulation cladding and the woven fabric or nonwoven layer β), with all layers being assembled and joined to one another under pressure, resulting in the inorganic binder penetrating into the woven fabric or nonwoven layer β).

The inorganic binder is preferably firstly brought into contact with the woven mesh α), with the woven mesh α) taking up the inorganic binder and additionally serving as layer thickness control for the inorganic binder. The layer thickness of the binder should, in the case of two-sided coating of the thermal insulation cladding, preferably be the same on both sides of the board in order to avoid bending of the plates by the shrinkage processes curing drying. The woven mesh α) can for this purpose be, for example, conveyed through a gap between two contrarotating rollers and in this way be provided with the inorganic binder. The woven mesh α) is preferably conveyed through a reservoir of the inorganic binder. This reservoir can be, for example, an impregnation tank which is filled with the inorganic binder. The amount of mortar taken up is dependent on the viscosity of the inorganic binder and also, in particular, on the layer thickness and structure of the woven mesh. The woven mesh α) is subsequently combined with the core layer and the woven fabric or nonwoven layer β).

However, it is also possible to introduce the inorganic binder directly between the core layer and the woven fabric of nonwoven layer β). In particular, introduction can be effected by injection by means of a flexible tube.

The process can, in particular, be carried out continuously and/or in an automated manner. It has been found that the process allows very wide variation in respect of the thickness of the thermal insulation cladding. As a result of the optionally simultaneous coating the thermal insulation cladding on both sides, the cladding is stabilized particularly well and warping of the thermal insulation cladding is prevented.

Joining of the layers of the thermal insulation cladding can be carried out under pressure using all methods known for this purpose to a person skilled in the art. In particular, the at least two-layer thermal insulation cladding can be pressed between two contrarotating rollers. The surface of the rollers can be smooth. However, it can also be advantageous for the rollers to have a surface structure and the structure to be embossed on the surface of the thermal insulation cladding after joining of the layers. The adhesion on fastening to the surface of a building and the adhesion of the render can be improved in this way. It is also particularly advantageous for the side facing the building and/or the side facing away from the building of the thermal insulation cladding to be coated with an organic or inorganic binder after joining.

In a preferred embodiment, when the thermal insulation cladding is coated with any inorganic binder, a binder accelerator is brought into contact with the inorganic binder before and/or after application of the inorganic binder. Here, the accelerator is preferably brought into contact with the binder, preferably by spraying, shortly before application to the thermal insulation cladding. However, it is also possible for the accelerator to be incorporated beforehand into the inorganic binder. In a further preferred embodiment, the accelerator is applied only after the binder layer has been applied to the thermal insulation cladding. This can once again preferably be effected by spraying. The accelerator can be, for example, a sulphate, nitrate, nitrite, formate, aluminate, silicate or hydroxide or a mixture thereof. Particular preference is given to aluminium salts such as aluminium sulphate and aluminium hydroxide, which are particularly preferably used as aqueous solutions.

The use of an accelerator has the advantage that the thermal insulation cladding has a high strength after a very short time. If the thermal insulation cladding is in the form of boards and a woven mesh α) and a woven fabric or nonwoven layer β) are applied, the thermal insulation boards can also be stacked immediately after production even without use of an accelerator. Hydraulic binders in particular in this way acquire optimal conditions during further curing since premature loss of water does not occur. Drying of the boards in an oven is not necessary in this case. This process according to the invention thus conserves resources particularly well and also leads to a significant cost reduction and improved stiffness of the board, based on the amount of inorganic binder used.

It is also possible for the thermal insulation cladding of the invention to comprise further layers; in particular, these layers can comprise glass fibres or rock wool. In a particular embodiment, the composite thermal insulation system of the invention has less than 4, in particular less than 2 and/ particularly preferably no, mechanical fastening points per square meter for joining to the wall of the building.

The thermal insulation cladding is preferably fastened to the exterior wall of the building by adhesive bonding, A mineral adhesive and reinforcing composition, in particular a composition based on white hydrated cement is, for example, suitable for this purpose. Furthermore, it is also possible to use an adhesive composition based on synthetic resin. In a preferred embodiment, from 1 to 50% by weight, in particular from 2 to 40% by weight, particularly preferably from 3 to 30% by weight and more preferably from 4 to 20% by weight, of aerogel, in particular silicate aerogel in powder form, is mixed into the adhesive. In this way, the layer thickness of the total composite thermal insulation system can be reduced further while maintaining the same heat transmission coefficient.

Suitable renders for the composite thermal insulation system of the invention are, in particular, mineral renders or decorative renders based on silicone resin. In a preferred embodiment, from 1 to 50% by weight, in particular from 2 to 40% by weight, particularly preferably from 3 to 30% by weight and more preferably from 4 to 20% by weight, of aerogel, in particular silicate aerogel in powder form, are mixed into the render. The thickness of the total composite thermal insulation system can be reduced further in this way at a given heat transmission coefficient.

As an alternative, it is also possible according to the present invention for the composite thermal insulation system for the thermal insulation of an exterior wall of a building to comprise a thermal insulation cladding, where the thermal insulation cladding contains from 25 to 95% by weight of aerogel and the thermal insulation cladding is joined on the side facing the building and/or the side facing away from the building in an outward direction in the following order by at least α) a woven mesh
and thereon at least
β) a woven fabric or nonwoven layer, where the thermal insulation cladding, the layer α) and the layer β) are joined by the inorganic binder. In a preferred embodiment, the thermal insulation cladding is coated in this way on the side facing the building and on the side facing away from the building. Furthermore, it is advantageous for the binder to penetrate at least partially into the layer β). The thermal insulation cladding in this case preferably contains from 5 to 75% by weight of inorganic fibres and from 0 to 70% by weight of inorganic fillers. Further preference is given in this context to the composite thermal insulation system having a gross heat of combustion of less than 4 MJ per square meter of wall area.

The preferred embodiments disclosed in respect of the main claim can correspondingly be advantageously applied to the abovementioned alternative embodiments of the invention and are in this context likewise to be considered to be preferred.

Overall, a composite thermal insulation system which has improved use properties is proposed. Owing to the structure, the thermal insulation cladding has a high flexural strength and the composite thermal insulation system of the invention has a high long-term mechanical stability. A further advantage of the system of the invention is that, in a preferred embodiment, it comes within the burning class A2 in accordance with DIN 4102-1 and can thus also be used as composite thermal insulation system for high-rise buildings.

The following examples illustrate the present invention.

EXAMPLE

The invention is illustrated below with the aid of the examples depicted.

1.) Thickness expansion of Spaceloft A2, a non-combustible insulation blanket available from Aspen Aerogels, has also been conducted using inorganic binders. Specifically, a series of 10 mm thick insulation samples measuring 20×20 cm were bonded to form a 50 mm monolithic insulation system via application of sodium silicate N at each interply interface. The materials were allowed to dry at 80° C. for 12 hours in a laboratory convection oven, followed by subsequent heat treatment at 120° C. The shear strength of panelized Spaceloft A2 prepared in such a fashion is shown in table 3 as a function of nominal glue loading.

TABLE 3

Shear strength of Spaceloft A2 bonded with Sodium Silicate N

| Sodium Silicate N Loading (g/m2) | Shear Strength (PSI) |
|---|---|
| 150 | 2.8 |
| 300 | 4.8 |
| 500 | 7.0 |
| 600 | 8.8 |

The thermal conductivity of the resulting 50 mm Spaceloft A2 panels (prepared with 300 g/m² sodium silicate N) was acquired according to the methods of ASTM C518 (3). The thermal conductivity values were within 10% of that observed for the individual layers. The heat of combustion values of a bonded 50 mm panel of Spaceloft A2 was also determined according to the methods outlined in ISO 1716. Panels prepared in such a fashion exhibited an average heat of combustion value of 2.2 MJ per kilogram.

2.) Rapid set of inorganic adhesives or binders can be achieved via chemical setting methods. These methods typically entail the use of acidic compounds to promote silica polymerization and/or the addition of multivalent ions to promote rapid precipitation. Such a strategy was used to rapidly fabricate insulation systems of Spaceloft A2 with thicknesses in excess of 10 mm. Specifically, a 10:1 (wt:wt) mixture of sodium silicate N and 40 wt.-% glyoxal in water was applied to the interfacial area of two plies of Spaceloft A2. After a period of 10 minutes at room temperature the binder underwent a highly exothermic disproportionation (Cannizzaro) reaction to produce a mildly acidic byproduct, glycolic acid. The formation of this acid lowered the pH of inorganic binder, promoted silica polymerization and formed a rigid, largely insoluble bond.

Panels prepared in such a fashion were rapidly heat treated; at 120° C. for 15 minutes and were assessed for shear strength according to the methods outlined in ASTM D5034. Use of chemical set methods such as this one will significantly reduce the cure time of inorganic binders to produce bonds that have strengths equivalent to those produced via evaporation/dehydration methods.

TABLE 4

Shear strength of Spaceloft A2 panels bonded with sodium silicate N and using rapid set methods with glyoxal.

| Sodium Silicate N Loading (g/m²) | Shear Strength (PSI) |
|---|---|
| 300 | 5.8 |
| 500 | 6.6 |
| 600 | 8.8 |

4.) The following example illustrates an aspect of the invention as depicted in FIG. 1. FIG. 1 schematically shows the structure of a composite thermal insulation system according to the invention. The composite thermal insulation system is affixed to a wall (1) of a building. Layer 2 is a reinforcing mortar based on white hydrated lime and cement (Heck K+A Plus® from BASF Wall System GmbH), to which 5% by weight of silicate aerogel powder (Nanogel® from Cabot Corporation) have been added and which has a layer thickness of from about 5 to 10 mm. The thermal insulation cladding is formed by five boards (3a to 3e). The boards 3a to 3e each have a layer thickness of 10 mm and comprise 50% by weight of silicate aerogel 15% by weight of inorganic filler (magnesium oxide) and 35% by weight of glass fibres. A process for producing the boards 3a to 3e is disclosed in US 2002094426. The boards 3a to 3e are joined to one another by means of a potassium water glass binder (5), with in each case about 120 g of potassium water glass binder (5), based on the solids content thereof, being used per square meter of wall area for adhesively bonding two layers. A layer of a polymeric material (acrylate dispersion; not shown in FIG. 1) is present on both sides of the thermal insulation cladding between layers 2 and 3a and between layers 3e and 4, with about 90 g having been applied to each of the two sides of the thermal insulation cladding (3a to 3e), based on the solids content of the dispersion, pet square meter of wall area. Layer 4 is a decorative render based on silicone resin (Heck SHP® from BASF Wall System GmbH), to which 8% by weight of silicate aerogel powder (Nanogel® from Cabot Corporation) have been added and which has a layer thickness of about 4 mm.

The invention claimed is:

1. An insulated building wall comprising a composite thermal insulation system and an external building wall, wherein the composite thermal insulation system is affixed to the side of the building wall facing away from the building, the composite thermal insulation system comprising an at least two-layer thermal insulation cladding, with at least two layers each containing from 25 to 95% by weight of aerogel and from 5 to 75% by weight of inorganic fibres and from 0 to 70% by weight of inorganic fillers, characterized in that the layers of the thermal insulation cladding are joined to one another by means of an inorganic binder and the composite thermal insulation system has a gross calorific potential of less than 3 MJ per kilogram, wherein the composite thermal insulation system is characterized in that the thermal insulation cladding is coated on the side facing the building and/or the side facing away from the building with a polymeric material.

2. The insulated building wall according to claim 1, wherein the composite thermal insulation system is characterized in that the inorganic binder is at least one component selected from the group consisting of potassium water glass, sodium water glass, cement and alkali-activated aluminosilicates.

3. The insulated building wall according to claim 1, wherein the composite thermal insulation system is characterized in that the aerogel is at least one aerogel based on silicon, aluminium and/or titanium.

4. The insulated building wall according to claim 1, wherein the composite thermal insulation system is characterized in that the inorganic filler is magnesium dioxide, titanium dioxide, titanium carbide, silicon carbide, iron(III) oxide, iron(II) oxide, zirconium silicate, zirconium oxide, tin oxide, manganese oxide or a mixture thereof.

5. The insulated building wall according to claim 1, wherein the composite thermal insulation system is characterized in that the inorganic fibres are glass fibres, rock fibres, metal fibres, boron fibres, ceramic fibres and/or basalt fibres.

6. The insulated building wall according to claim 1, wherein the composite thermal insulation system is characterized in that the coating of the thermal insulation layer is hydrophobic and the aerogel is a hydrophilic aerogel.

7. The insulated building wall according to claim 1, wherein the composite thermal insulation system is characterized in that the thermal insulation cladding is an at least three-layer thermal insulation cladding, where at least three layers contain from 25 to 95% by weight of aerogel, from 5 to 75% by weight of inorganic fibres and from 0 to 70% by weight of inorganic fillers and each layer has a layer thickness in the range from 0.5 to 2 cm.

8. The insulated building wall according to claim 1, wherein the composite thermal insulation system is characterized in that the composite thermal insulation system has less than 4 mechanical fastening points per square meter for joining to the wall of a building.

9. An insulated building wall comprising a composite thermal insulation system and an external building wall, wherein the composite thermal insulation system is affixed to the side of the building wall facing away from the building, the composite thermal insulation system comprising an at least two-layer thermal insulation cladding, with at least two layers each containing from 25 to 95% by weight of aerogel and from 5 to 75% by weight of inorganic fibres and from 0 to 70% by weight of inorganic fillers, characterized in that the layers of the thermal insulation cladding are joined to one another by means of an inorganic binder and the composite thermal insulation system has a gross calorific potential of less than 3 MJ per kilogram, wherein the composite thermal insulation system is characterized in that the thermal insulation cladding is coated on the side facing the building and/or the side facing away from the building with an inorganic binder.

10. The insulated building wall according to claim 9, wherein the composite thermal insulation system is characterized in that at least α) a woven mesh and thereon at least β) a woven fabric or nonwoven layer, in order, joined on the thermal insulation cladding on the side facing the building and/or the side facing away from the building in the outward direction and inorganic binder between the thermal insulation cladding, the mesh α) and the fabric or layer β).

11. The insulated building wall according to claim 10, wherein the composite thermal insulation system is characterized in that the binder penetrates at least partially into the layer β).

12. The insulated building wall according to claim 10, wherein the composite thermal insulation system is characterized in that the layer β) is a structural nonwoven made of polyester, polypropylene, polystyrene, glass fibres or mixtures thereof.

13. The insulated building wall according to claim 10, wherein the composite thermal insulation system is characterized in that the layers α) and β) joined by means of the inorganic binder have a thickness of from 0.5 to 5 mm.

14. The insulated building wall according to claim 10, wherein the composite thermal insulation system is characterized in that the coating of the thermal insulation layer is hydrophobic and the aerogel is a hydrophilic aerogel.

15. The insulated building wall according to claim 9, wherein the composite thermal insulation system is characterized in that the inorganic binder that joins the layers of the insulation cladding is at least one component selected from the group consisting of potassium water glass, sodium water glass, cement and alkali-activated aluminosilicates.

16. The insulated building wall according to claim 9, wherein the composite thermal insulation system is characterized in that the aerogel is at least one aerogel based on silicon, aluminium and/or titanium.

17. The insulated building wall according to claim 9, wherein the composite thermal insulation system is characterized in that the inorganic filler is magnesium dioxide, titanium dioxide, titanium carbide, silicon carbide, iron(III) oxide, iron(II) oxide, zirconium silicate, zirconium oxide, tin oxide, manganese oxide or a mixture thereof.

18. The insulated building wall according to claim 9, wherein the composite thermal insulation system is characterized in that the inorganic fibres are glass fibres, rock fibres, metal fibres, boron fibres, ceramic fibres and/or basalt fibres.

19. The insulated building wall according to claim 9, wherein the composite thermal insulation system is characterized in that the thermal insulation cladding is an at least three-layer thermal insulation cladding, where at least three layers contain from 25 to 95% by weight of aerogel, from 5 to 75% by weight of inorganic fibres and from 0 to 70% by weight of inorganic fillers and each layer has a layer thickness in the range from 0.5 to 2 cm.

* * * * *